Patented July 12, 1949

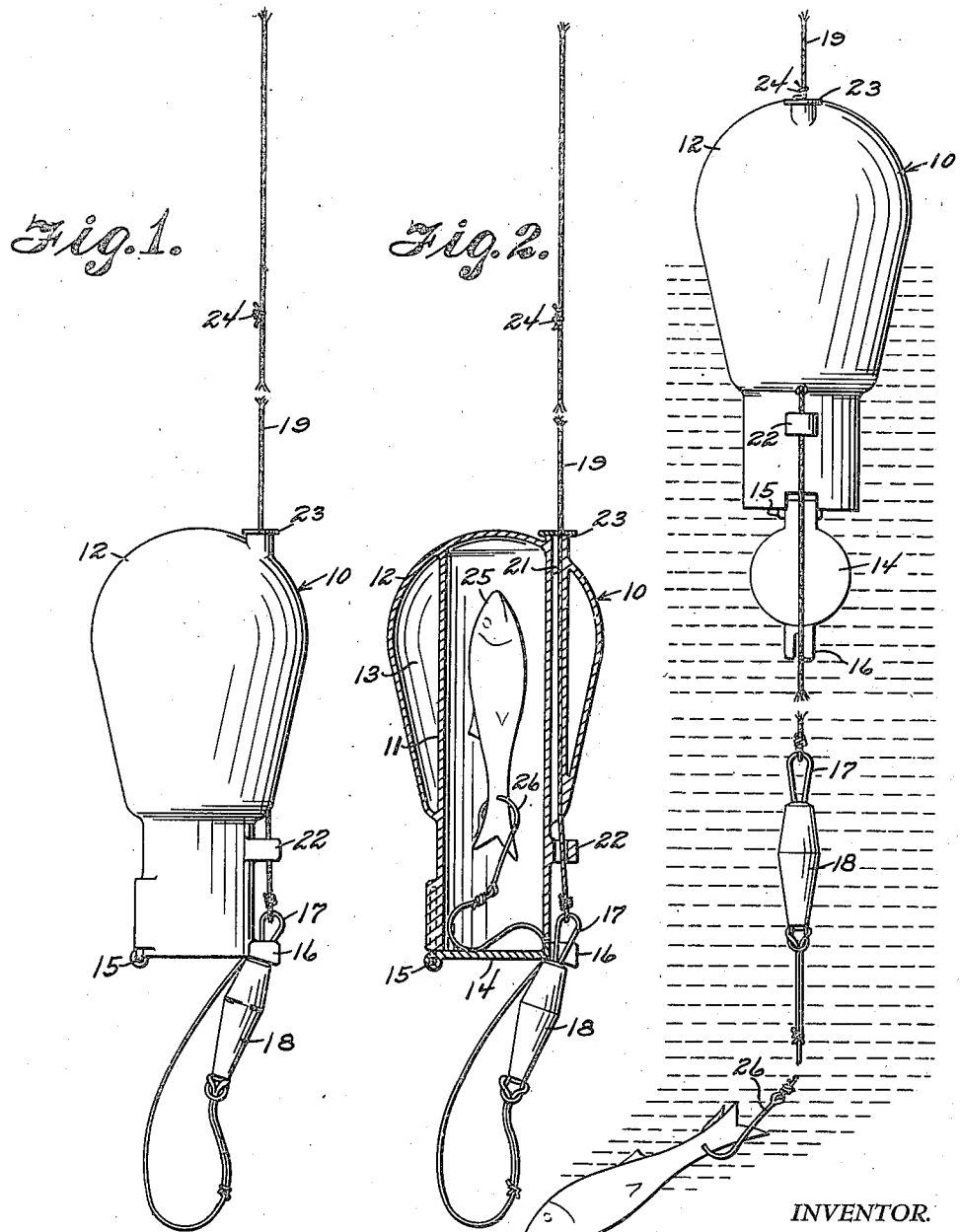

2,475,736

UNITED STATES PATENT OFFICE 2,475,736

LIVE BAIT CASTER

James Monroe Burrous, Washington, Ind.

Application August 27, 1947, Serial No. 770,819

3 Claims. (Cl. 43—41)

This invention relates to a live bait casting device.

It is an object of the present invention to provide a casting device which will house the live bait while the same is cast by a line and will thus prevent the bait from being killed or spoiled upon its engagement with the water or with any interference above or overhanging the water into which the device with the bait is to be extended.

It is another object of the present invention to provide a device which will house flies and other artificial baits which are ordinarily too light to be cast and so that they too will be protected.

It is still another object of the present invention to provide a device for housing bait which can easily be adjusted upon its arrival in the water to free the bait from the same and wherein this action can be effected by simply a release of the line.

For other objects and for a better understanding of the invention, reference may be had to the following detailed description taken in connection with the accompanying drawing, in which Fig. 1 is a side elevational view of the casting device embodying the features of the present invention.

Fig. 2 is a longitudinal cross-sectional view taken through the device.

Figure 3 is a side elevational view with the cover on the bottom of the same extended and the live bait released therefrom and extended into the water.

Referring now to the figures, 10 represents the bait housing device which is formed with a central cylindrical housing 11 with a bulbous formation 12 extended over the same. The space as indicated at 13 has air or other gas therein and will, when the device is in the water, maintain the same in an upright position as shown in Fig. 3. The lower end of the cylindrical housing 11 has a cover 14 which is hinged as indicated at 15 to one side thereof. At the opposite side of the cover is a bifurcated portion 16 through which a loop 17 of a sinker 18 may be extended whereby to keep the cover closed as when the device is being cast with its line 19. As long as the line is kept tight, the cover 14 will be kept closed. Along one side of housing 11 is a passage means 21 through which the line 19 is extended. Also there is provided on the exterior of the housing 11 a lug 22 with a hole therein through which the line 19 is extended. The top of the passage 21 is partially closed by a stop plate 23 which is apertured for the passing therethrough of the line 19. On the line 19 is a knot 24 and when the line is released after the device has been thrown or cast into the water, the line will pass downwardly through the passage 21 until the knot 24 engages the plate 23. The cover 14 will thereupon be released and bait 25 on a hook 26 on the end of the line will pass outwardly from the cylindrical housing to be lowered into the water. When the user releases the line 19, the weight of the sinker 18 causes the sinker to move downwardly toward the bottom of the body of water. This releasing of the line 19 permits free swinging movement of the cover 14 and as the sinker 18 moves downwardly, it pulls the bait 25 out into the water since a line is connected, or extends between the sinker 18 and the hook 26 carrying the bait 25. The distance to which the bait is lowered will be dependent upon the location of the knot 24 in the line. The device will remain in a floating position on the top of the water. If it is desired to fish the bottom of the water, the knot 24 is dispensed with. Thereafter the line can be allowed to pass downwardly to any desired extent so that the bait will reach the water bottom.

The device can be made in any number of sizes depending upon the size of the bait to be used, the size of the line, and so forth. The device is preferably made of light weight plastic and may be transparent if desired.

While various changes may be made in the detail construction, it shall be understood that such changes shall be within the spirit and scope of the present invention as defined by the appended claims.

I claim:

1. A casting device comprising a housing having an opening, a cover mounted for opening and closing movement with respect to said opening, said housing being adapted to contain a bait to be cast and to protect the same, a line, a sinker on said line and means for slidably connecting the line to the housing whereby the sinker will serve to retain the cover in a closed position while the device is being cast.

2. A casting device comprising a cylindrical housing, a bulbous formation on the upper end of the cylindrical housing and an air tight space provided between the bulbous formation and the housing, the bottom end of the housing having a cover to retain a bait within the same, said cover being hinged to one side of the housing opening, a portion on the cover projecting from the opposite side, passage means extending along the outside of the housing and through the bulbous formation through which a line may be extended for sliding movement therethrough, said line when pulled upwardly adapted to have its sinker drawn against the projection on the cover whereby to retain the cover in a closed position, a plate on the upper end of the passage means adapted to be engaged by a knot in the line for limiting the extent to which the bait may be extended below the housing and into the water after being released from said housing.

3. A casting device comprising a housing having an opening, a cover mounted for opening and closing movement with respect to said opening, said housing being adapted to contain a bait to be cast and to protect the same, a line, a sinker on said line, and means for slidably connecting the line to the housing whereby the sinker will serve to retain the cover in a closed position while the device is being cast, said cover having a bifurcated formation through which an end of the sinker can be moved and the sinker proper retained, a knot in the line for limiting the amount of release of the line after the casting operation, and a stop plate for engagement with the knot to limit the sliding movement of the line and extent to which the bait is moved.

JAMES MONROE BURROUS.

REFERENCES CITED

The following references are of record in the file of this patent:

UNITED STATES PATENTS

| Number | Name | Date |
|---|---|---|
| 1,003,962 | Henning | Sept. 19, 1911 |
| 1,764,738 | Marsters | June 17, 1930 |
| 2,260,705 | Eguchi | Oct. 28, 1941 |
| 2,292,743 | Cordry | Aug. 11, 1942 |